Dec. 11, 1951  E. D. GOODALE ET AL  2,578,420
CAMERA ATTACHMENT FOR HOLDING AN ILLUMINATED TRANSPARENCY
IN FRONT OF THE CAMERA LENS
Filed April 15, 1949  3 Sheets-Sheet 1
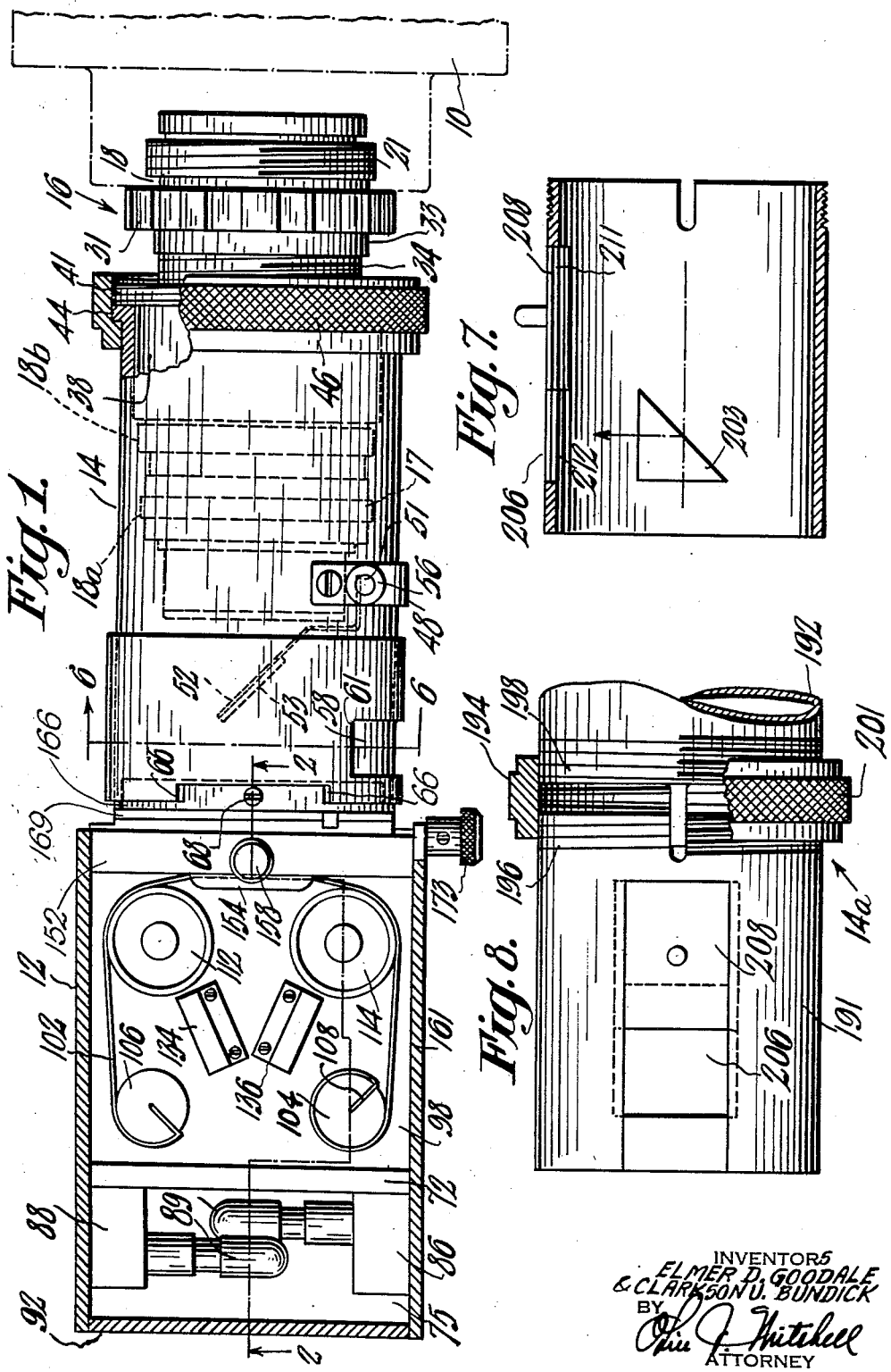
INVENTORS
ELMER D. GOODALE
& CLARKSON U. BUNDICK
BY
ATTORNEY

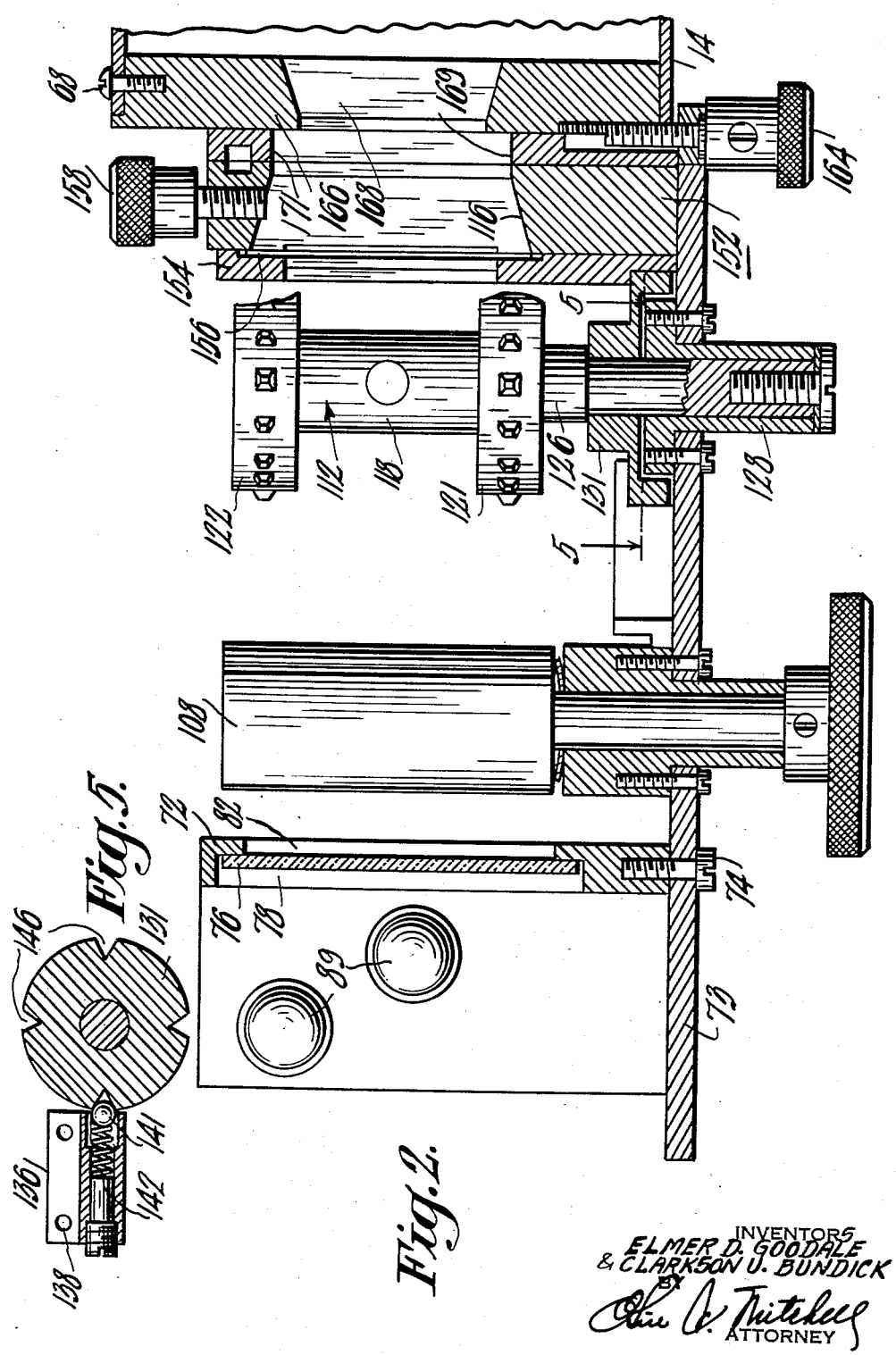

Dec. 11, 1951 E. D. GOODALE ET AL 2,578,420
CAMERA ATTACHMENT FOR HOLDING AN ILLUMINATED TRANSPARENCY
IN FRONT OF THE CAMERA LENS
Filed April 15, 1949 3 Sheets-Sheet 3
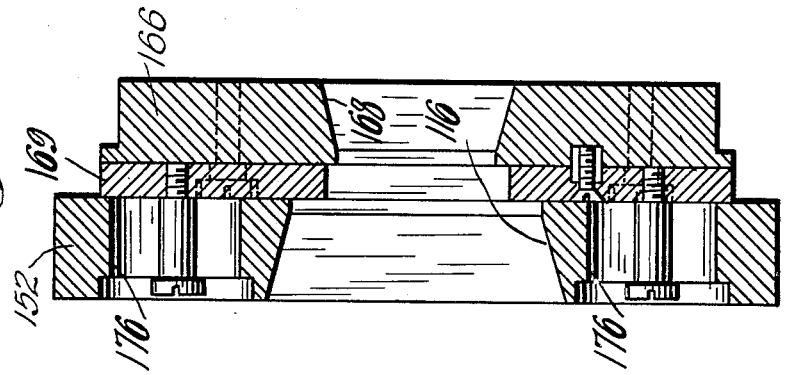
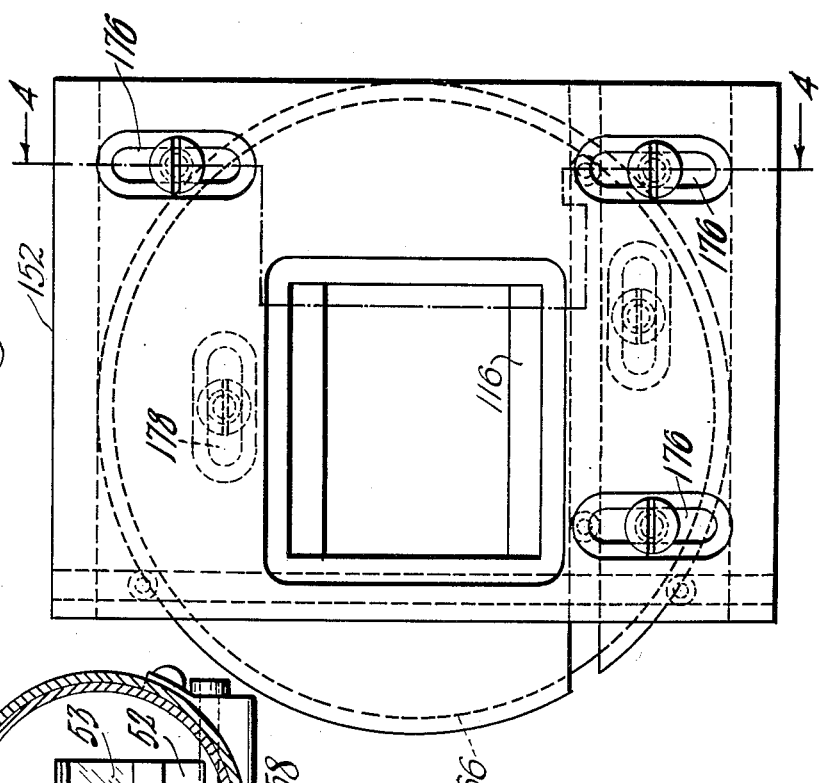
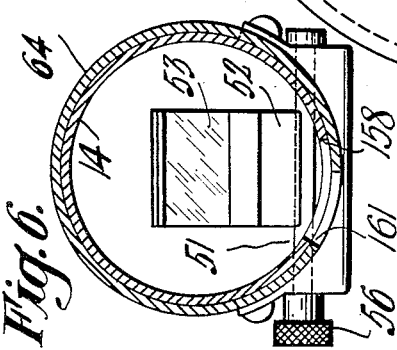
INVENTORS
ELMER D. GOODALE
& CLARKSON U. BUNDICK
BY
ATTORNEY Patented Dec. 11, 1951

2,578,420

UNITED STATES PATENT OFFICE 2,578,420

CAMERA ATTACHMENT FOR HOLDING AN ILLUMINATED TRANSPARENCY IN FRONT OF THE CAMERA LENS

Elmer D. Goodale, New Rochelle, and Clarkson U. Bundick, Scarsdale, N. Y., assignors to Radio Corporation of America, a corporation of Delaware Application April 15, 1949, Serial No. 87,604

5 Claims. (Cl. 88—16)

The present invention relates to an attachment for a camera, such as an image signal generating camera, or a motion picture camera and, more particularly, but not necessarily exclusively, to a novel attachment for a television camera to project a desired image onto the light sensitive area of a pick-up tube in a camera. The attachment of this invention is also applicable to a motion picture camera in which case the image will be projected onto the film in the camera.

In connection with the operation of a television camera employing an image Orthicon type of pick-up tube, several focus adjustments must be made so that a good image signal will be obtained. A sharply focused optical picture on the photocathode surface of the pick-up tube assists in adjusting the several electronic focus controls within or associated with the camera so that they are properly set when an image signal representing a view or a scene is to be scanned.

When a television camera is to be used "in the field" away from a television studio, for example, to televise an outdoor event or an indoor scene, where a camera technician does not have full control of local conditions such as lighting, space for test set-ups, etc., it is almost impossible to provide for the derivation of a test signal from a well illuminated placard. The same difficulty arises when a camera technician attempts to originate spot announcements, station identification or other items of interest in the field. The usual practice in the field is to have a separate camera chain set up at some remote point or suitable placard approximately two feet by three feet in size to be arranged at a distance of several feet from the camera.

The principal aim or object of the present invention is to provide compact, novel and portable means for projecting an image or series of images onto the light-sensitive medium within a camera.

Another object is to facilitate aligning and focusing a television pick-up tube in a novel manner.

A further object of the invention is to provide novel facilities for presenting "spot" video announcements, station identification and other items of interest for transmission by a television camera.

Other objects and advantages of the invention will, of course, become apparent and immediately suggest themselves to those skilled in the art to which the invention is directed from a reading of the following specification in connection with the accompanying drawings in which:

Fig. 1 is a vertical elevation view partially in section of the novel camera attachment of this invention;

Fig. 2 is an enlarged fragmentary plan view in section, the section being taken on line 2—2 of Fig. 1;

Fig. 3 is an end view of certain of the parts shown by Figs. 1 and 2;

Fig. 4 is a sectional elevation of the parts illustrated by Fig. 3, the section being taken on line 4—4 of Fig. 3;

Fig. 5 is a fragmentary enlarged sectional view taken on line 5—5 of Fig. 1;

Fig. 6 is a view in sectional elevation of another of the parts shown in Fig. 1, the section being taken on line 6—6 of Fig. 1.

Fig. 7 is a fragmentary sectional elevation of another embodiment of the invention; and Fig. 8 is a view in plan of the embodiment of Fig. 7.

The embodiment of the camera attachment shown in the above referred to drawing, which illustrates the invention, and one manner of carrying it out, is compact and can readily be attached to any television camera. It will be understand that while the invention is described fully with respect to the result attained by use in combination with a television camera, it may be readily employed with a motion picture camera for the purpose of introducing titles or explanatory matter. The illustrative embodiment of the drawing is shown as being detachably connected to the housing 10 of a television camera. This housing 10, although not shown in detail, provides a means for selectively positioning lens units (not shown) with respect to the sensitive surface of the signal generating instrumentality in the camera. Solely, by way of example, a commercially available television camera known as the TK-30 is usable with the embodiment selected for illustrative purposes.

The camera attachment, which is shown in Fig. 1, of the drawing, comprises a housing 12 for accommodating the film and a light source, an elongated member shown as being in the form of a tube 14, and a lens adaptor 16. The adaptor 16 securely holds a camera lens assembly 17. This lens assembly provides a short focus lens, and it is, or may be, of the type which would be secured directly in the usual manner to the turret housing 10 of the television camera. The lens assembly has the usual focus and aperture adjustments 18a and 18b.

The adaptor 16 includes a reduced portion 18 which is threaded, as indicated at 21, to be received in the threaded opening of the housing 10. A knurled sleeve 31 serves as a convenient means for rotating the adapter 16. Another section 33 of the adapter 16 is threaded as indicated at 34 to receive a cooperating member having a hollow barrel body 38 which is provided with a threaded flange 41. The barrel body 38 receives the lens combination. Preferably, the coupling between the lens combination and the barrel body is effected in the same manner as when the lens combination is secured directly to the camera turret 10.

The tube 14 is provided at its end with a flange 44, the exposed face of which seats against the face of the threaded flange 41. An internally threaded union or coupling member 46 serves to clamp the parts together upon threaded engagement with the flange 41.

The tube 14 has bearing brackets 48 which accommodate a shaft 51 (Figs. 1 and 6). An arm 52 within the tube carries a plane mirror 53 which can be swung from the illustrated position to a position parallel of the axis of the tube 14 and against its walls with manipulation of a thumb piece 56. A square aperture 58 is formed in the sleeve 14 so that the face of the mirror 53 may be viewed through the aperture 58 and an aperture 61 in the rotatable sleeve 64. When the aperture 58 is not in use, it is covered by rotating sleeve 64 which is telescoped over the tube 14. An elongated notch having ends 66, cooperates with a pin or screw 68. This screw 68 serves to secure the housing 12 to the tube 14.

The housing 12, as shown in Figs. 1 and 2, is provided with a partition 72 secured to the bottom wall 73 of the housing by suitable means such as a screw or screws 74. This partition defines one end of a lamp compartment 75. A sheet of light diffusing material 76, ground glass, for example, is secured in any suitable manner in a recess 78 in the partition 72 so as to cover a square opening 82. Insulating blocks 86 and 88, each having suitable fittings and connections for a pair of lamp bulbs 89 are secured within the lamp compartment 75. This compartment is provided with a removable back 92 for obtaining access to the lamps. Any suitable power supply source (not shown) may be employed for furnishing current to the lamps. Preferably, a rheostat (not shown) should be used in the supply connection to the lamps so that the illumination level can be regulated.

A film compartment 98 houses means for supporting and moving a film strip 102. As shown in the illustrative example, two film spools 104 and 106 are provided. These film spools are each provided with the usual slot 108 to receive the end of the film. Film sprocket assemblies 112 and 114 are provided for positioning the film with respect to the film aperture 116 (Fig. 4). The sprocket assembly 112 is shown in detail in Fig. 2 and comprises a hollow center shaft 118 having two sprocket wheels 121 and 122 thereon. A spindle 126 is revolably carried by a bearing housing 128 in the bottom wall 73 of the member 14. A detent member 131 is secured to the spindle 126. A similar detent member is secured to the spindle 126 for the sprocket assembly 114. Housing members 134 and 136 carry ball detent members for engagement with notches in the detent members 131. Referring to Fig. 5, one of these assemblies, for example the assembly associated with sprocket assembly 114, is shown in detail. The housing member 136 is secured, for example, by screws 138 to the bottom wall 73 of the section 12. A ball detent member 141 is pressed outwardly by a spring 142 to engage notches 146. Four of these notches are shown illustratively spaced 90° apart which, with a general arrangement shown, accommodates the frame spacing of 36 mm. film and insures the centering of a selected film frame with respect to the previously mentioned frame aperture 116.

The film strip may include a test pattern frame or frames and one or more transparent frames along with announcements, program material and the like. The transparent frames can be used to "wipe off" any images "burned on" the camera tube if this should happen.

The previously mentioned aperture 116 is provided in a partition member 152 which extends upwardly from the bottom wall or base 73 of the section 14. This partition carries a recessed member 154 and the film 102 passes through a slot 156. The sprocket wheels 121 and 122 of each sprocket wheel assembly lie on each side of the member 154 as shown in Fig. 1 of the drawings. A knurled screw 158 provides for clamping a U-shaped cover 161 over the section 12 of the camera attachment. A thumb screw 164 serves as a means for laterally adjusting the circular apertured member 166 as viewed on Fig. 2 of the drawings. This member is provided with a light aperture 168. Another apertured member 169 having light aperture 171 is movable laterally as viewed in Fig. 1 of the drawings by means of a thumb screw 173. Movement of the member having the aperture 168 is provided with elongated slots 176, as shown in Fig. 4. The member 169 is provided with elongated slots 178 so as to permit its movement when it is driven by the thumb screw 173.

Figs. 7 and 8 of the drawing disclose an embodiment of the invention which is illustrated in connection with the assembly corresponding to the member 14 of Fig. 1. Inasmuch as this assembly correspnds to the member 14 of Fig. 1, it is designated generally by reference character 14a on Figs. 7 and 8. The assembly 14a comprises two parts 191 and 192 which are axially adjustable with respect to each other so as to provide for elongating or shortening the assembly 14. This provides a focusing adjustment by changing the distance between the film frame positioned in the projector aperture and the lens. As shown in Figs. 7 and 8, the parts 191 and 192 are coupled by a sleeve 194. The part 191 is provided at its end with right-hand threads 196, for example, and the part 192 is provided at its end with left-hand threads 198, for example. The sleeve 194 is internally threaded with right-hand and left-hand threads at each end so that it is turned, the parts 191 and 192 are drawn together or spread apart. The sleeve 194 is knurled, as indicated at 201, to provide a firm grip for adjusting purposes.

To provide for examining the film frame which is aligned for scanning, a prism 203 is supported in any suitable manner (not shown) in the light path from the film to the camera lens when the assembly 14a is used in place of the member 14 of Fig. 1, for example. The part 191 is cut away, as shown in Fig. 8, to provide an aperture 206. A sliding cover 208 is movable to uncover the opening 206 so that the film frame, in position to be scanned, may be easily viewed with the aid of the prism 203. It will be understood that any means may be employed for providing sliding engagement between the cover 208 and the part 191. As shown, by way of example in Figs. 7 and 8, the cover 208 is flanged, as indicated at 211 to slidably engage grooves 212.

It will be seen that the camera attachment of this invention provides a ready means for projecting desired images appearing on a film strip into a camera when desired. The entire attachment is quickly removable from the camera so that it may be employed for televising any desired view or scene after electronic focus adjustments have been made therein with the aid of the camera attachment of this invention. The attachment disclosed herein may be left in position on the turret of the camera and is readily available for use, merely by rotating the turret to bring it into alignment with the television camera aperture. Announcements and special effects may be attained at any time by mounting the camera attachment of this invention on the camera in place of the lens employed when televising a view or scene in the normal manner. With the aid of an additional camera, superimposed images may be obtained.

What is claimed is:

1. An attachment for a camera, said attachment comprising, means to receive a camera lens assembly, said means having means thereon to be removably received by the lens holding connection of a camera in aligned relationship with the light receiving parts of the camera, an illumination box having means for attachment to said first named means, a source of illumination in said box, means to support a transparency before said illumination source, a member having an aperture positioned in the light path to said lens, means to adjust the position of said member with respect to said transparency supporting means, a transparency viewing aperture in said first named means, and means for providing for visual inspection of a transparency through said transparency viewing aperture.

2. An attachment for a camera, said attachment comprising, means to receive a camera lens assembly, said means having means thereon to be removably received by the lens holding connection of a camera, a film holder having means to be detachably received by said first named means, a source of illumination in said film holder, means to position and move a film for frame-by-frame exposure before said illumination source, a member having an aperture positioned between said film and a lens assembly received by said first named means, means to adjust the position of said member with respect to said film positioning means, a film viewing aperture in said first named means, and means providing for visual inspection of a film frame through said film viewing aperture.

3. An attachment for a camera, said attachment comprising, an adaptor to receive a camera lens assembly, said adaptor having connecting means to be received by the lens holding connection of the lens turret of a television camera, a film holding box having means to be detachably received by said adaptor, a source of illumination in said box, means in said box to position and move a film for frame-by-frame exposure before said illumination source, a member having an aperture positioned between said film and a lens assembly received by said adaptor, means to adjust the position of said member with respect to said box, a film viewing aperture in said adaptor, and means for providing for visual inspection of a film frame through said film viewing aperture.

4. An attachment for a camera, said attachment comprising, an adaptor to receive a camera lens assembly, said adaptor having connecting means to be received by the lens holding connection of the lens turret of a television camera, a film holding box having means to be detachably received by said adaptor, a source of illumination in said box, means in said box to position and move a film for frame-by-frame exposure before said illumination source, a film viewing aperture in said adaptor, a mirror in said adaptor to provide for visual inspection of a film frame through said film viewing aperture, means to move said mirror to and from film inspection position, and means to cover said aperture.

5. An attachment for a camera, said attachment comprising an adaptor to receive a camera lens assembly, said adaptor having connecting means to be received by the lens holding connection of the lens turret of a television camera, a film holding box having means to be detachably received by said adaptor, a source of illumination in said box, means in said box to position and move a film for frame-by-frame exposure before said illumination source, a film viewing aperture in said adaptor, a prism in said adaptor to provide for visual inspection of a film frame through said film viewing aperture, and means to cover said aperture.

ELMER D. GOODALE.
CLARKSON U. BUNDICK.

REFERENCES CITED

The following references are of record in the file of this patent:

UNITED STATES PATENTS

| Number | Name | Date |
|---|---|---|
| 1,262,578 | Cameron | Apr. 9, 1918 |
| 1,524,276 | Puffer | Jan. 27, 1925 |
| 1,619,551 | Uhlemann | Mar. 1, 1927 |
| 1,885,555 | Schwartz | Nov. 1, 1932 |
| 1,991,311 | Barbieri | Feb. 12, 1935 |
| 2,179,164 | Sabel | Nov. 7, 1939 |
| 2,296,765 | Brost | Sept. 22, 1942 |
| 2,303,181 | Thomas | Nov. 24, 1942 |
| 2,330,709 | Harper et al. | Sept. 28, 1943 |
| 2,339,377 | Clark et al. | Jan. 18, 1944 |
| 2,483,147 | Mol | Sept. 27, 1949 |

FOREIGN PATENTS

| Number | Country | Date |
|---|---|---|
| 1,527 | Great Britain | of 1859 |
| 174,622 | Great Britain | June 25, 1923 |